United States Patent
Etheridge

(10) Patent No.: US 6,772,783 B2
(45) Date of Patent: Aug. 10, 2004

(54) ROTARY TO LINEAR VALVE AND METHOD OF USE

(76) Inventor: Reggie H. Etheridge, 307 Lago Vista, Kemah, TX (US) 77565

( * ) Notice: Subject to any disclaimer, the term of this patent is extended or adjusted under 35 U.S.C. 154(b) by 0 days.

(21) Appl. No.: 10/207,363

(22) Filed: Jul. 29, 2002

(65) Prior Publication Data

US 2003/0075217 A1 Apr. 24, 2003

Related U.S. Application Data

(63) Continuation-in-part of application No. 09/612,754, filed on Jul. 10, 2000, now abandoned.

(51) Int. Cl.7 .................................................. F16K 3/24
(52) U.S. Cl. ................. 137/15.18; 137/219; 137/625.3; 137/625.33; 251/260
(58) Field of Search .............................. 137/15.18, 219, 137/625.3, 625.33; 251/260

(56) References Cited

U.S. PATENT DOCUMENTS 4,611,630 A  *  9/1986  Muchow et al. ............ 137/219

* cited by examiner

*Primary Examiner*—Gerald A. Michalsky
(74) *Attorney, Agent, or Firm*—The Matthews Firm

(57) ABSTRACT

A valve is disclosed that is operable by converting rotational force of a stem into linear motion of a valve closure element, such as a sleeve, to control fluid flow through the valve. In a presently preferred embodiment, at least two interconnection members are rotatably mounted, such as with a round end, to a stem drive element. The interconnection members are slidably mounted into channels or grooves in a sleeve. Rotatable movement of the stem permits rotation of the interconnection members whereby the interconnection members are constrained to slide in the channels whereby rotational movement of the stem is converted into translational or linear movement of the valve closure element.

11 Claims, 8 Drawing Sheets

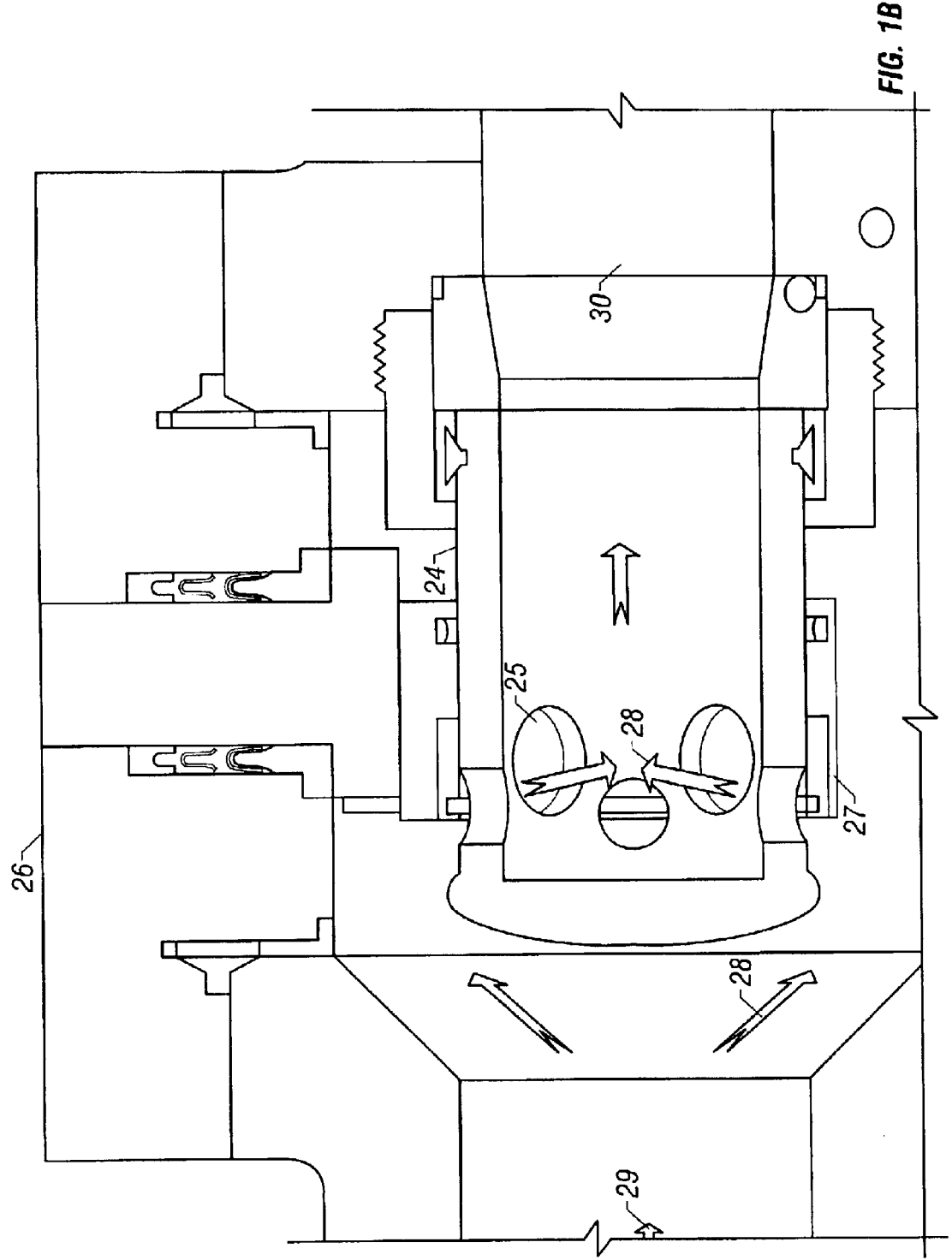

ROTARY TO LINEAR VALVE AND METHOD OF USE

This is a continuation-in-part of U.S. patent application Ser. No. 09/612,754, filed Jul. 10, 2000, now abandoned.

TECHNICAL FIELD

The present invention relates generally to valves and, more particularly, to a valve that provides a rotary-to-linear assembly to control linear movement of a closure element in response to rotation of a valve stem.

BACKGROUND ART

Means for operating the closure element of a valve to thereby control flow through the valve are well known in the prior art. A unique type of rack and pinion means for operating the closure element is disclosed in the parent to this application that solves many problems of prior art valves. However, in some cases, it would be desirable to provide a highly reliable means for operating a rotary to linear valve that is easily adaptable to various valve sizes and which may be manufactured at relatively low cost, as described herein.

Generally, a valve is most commonly a mechanical device that regulates the flow of gases, liquids, or loose materials by blocking and uncovering openings. Typically a valve is used to regulate or control fluid flowing across a device or juncture. A valve may be positioned such that the flow across the openings is wide open, completely closed or any position in between. In fact, an important development in valves was the invention of a valve that could be selectively opened in a plurality of positions from wide open to closed.

This variety of valves has been used for controlling the throttle of a flow of fluid. Most throttle control valves are operated by a sliding stem or a rotary action. These sliding stem or rotary valves have been actuated by mechanical, electrical or pneumatic means. However, the majority of presently available rotary valves employ many components. These many components are often subject to time consuming, labor intensive and expensive repair. Examples of some of the components are rotary link arms, rotary shafts, and diaphragm rods.

Further, and common in the art is a right angle gear or a rack and pinion gear. These gears have been used for a long time in the prior art for purported conversion of a rotational force into a linear force. Prior art devices such as U.S. Pat. Nos. 3,265,173; 4,018,097; 4,046,210; 4,050,534; 4,263,834; and 4,651,587 utilize a pinion gear for right angle drive trains and for heavy duty drive axles. These different gears are configured for different gear ratios and may have different number of teeth for different required torque. However, these gears do not truly convert a rotational motion into a linear motion.

Other examples of the prior art include U.S. Pat. No. 4,611,630 which discloses a choke valve with an internal cylinder and an external sleeve. The sleeve is controlled by a hydraulic control mechanism for opening and closing the ports. However, the valve is not opened and closed with the translation of rotational motion to linear motion. A drive shaft is fixed with a pin that is off center and is positioned within a slot of a carrier plate. When the drive shaft is rotated, the carrier plate is rotatably moved back and forth.

U.S. Pat. No. 5,623,966 discloses a choke for controlling the flow of fluid through a body having a fluid outlet. A rotatable handle is attached to a rotatable inner sleeve that moves from a position obscuring an opening to a position not obscuring the opening. The valve does not translate rotary motion to linear motion.

Accordingly the art does not have a valve that translates a rotational force into a linear force for selective operation of a valve.

SUMMARY OF THE INTENTION

The present invention provides a valve for controlling fluid flow. The valve comprises one or more elements such as, for example only, a valve housing that is substantially tubular and comprises a tubular wall. The tubular wall defines a fluid flow path within the tubular wall and the valve housing defines an inlet for receiving the fluid into the fluid flow path. The valve housing defines an outlet through which the fluid exits from the fluid flow path of the valve housing. The valve housing also defines a bonnet aperture within the tubular wall. A bonnet is sealingly securable to the bonnet aperture and the bonnet defines a stem shaft aperture therethrough. A rotatable stem shaft extends through the stem shaft aperture in the bonnet. The rotatable stem shaft has a stem shaft axis of rotation. At least one stem shaft seal may preferably be utilized between the rotatable stem shaft and the bonnet if necessary to prevent fluid leakage. A stem drive element for the rotatable stem shaft is mounted with respect to the stem shaft seal such that the stem drive is exposed to the fluid pressure within the valve housing. A tubular cage is mounted within the valve housing. The tubular cage has a tubular axis and defines one or more holes therein. The bonnet aperture is positioned radially outwardly with respect to the tubular axis of the tubular cage. The rotatable stem shaft is oriented with respect to the tubular cage element such that the stem shaft axis of rotation intersects with the tubular cage element. A sleeve slidably is mounted with respect to the tubular cage. The sleeve may be moveable between a first position and a second position for covering and uncovering the one or more holes to thereby control the fluid flow through the valve. An interconnection is provided between the stem drive element and the sleeve such that the sleeve is moveable between a first position and a second position relative to the tubular cage in response to rotation of the stem shaft.

The valve may further comprise a tubular cage and a sleeve having in combination a diameter, the bonnet aperture having a bonnet aperture diameter greater than the diameter of the tubular cage and the sleeve in combination. In one preferred embodiment, the cage has a closed end and an open end. The closed end of the cage may be substantially hemispherical.

The sleeve drive element may define a first channel therein. In a preferred embodiment, the first channel comprises a first side and a second side such that the first side and the second side are substantially parallel with each other. The sleeve may also define a second channel therein.

The valve may further comprise a first interconnection member for insertion in the first channel and/or a second interconnection member for insertion into the second channel.

In another embodiment, a valve is provided that comprises one or more elements such as, for example, a rotatable stem shaft that extends through an aperture in the valve housing, at least one actuator shaft seal around the rotatable stem shaft, a stem drive element for the rotatable stem shaft drive shaft, a closure element slidably mounted for linear movement with respect to valve housing to thereby control the fluid flow through the valve, and a plurality of interconnection members for interconnecting the rotatable shaft and the closure element wherein the plurality of interconnection members are slidably mounted to at least one of the stem drive element or the closure element. In one embodiment, the valve further comprises a tubular cage defining apertures therein which are coverable and uncoverable by the closure element. Preferably, at least one of the stem drive element or the closure element defines a first channel and/or a second channel. The plurality of interconnection members each have a plurality of linear connections, and the plurality of extensions are mounted the first channel and/or the second channel. The plurality of extensions are mounted for linear movement within in the first channel and/or the second channel. The first channel and the second channel are preferably oriented in different directions with respect to each other. In a preferred embodiment, the plurality of interconnection members have a rotatable connection at one end thereof and a slidable connection at an opposite end thereof.

A method is provided for assembling a valve which comprises one or more steps such as, for instance, providing a valve body with an inlet and an outlet and a bonnet port, attaching a sleeve to a cage such that the sleeve is slidable in a linear direction to cover and uncover apertures on the cage, inserting the cage and the sliding sleeve into the valve body through the bonnet port, mounting a bonnet to the bonnet port, sealing a rotatable shaft which extends through the bonnet with a shaft seal to prevent fluid leakage through the bonnet, providing a stem drive element on the stem shaft, and interconnecting the stem drive element and the sleeve with a plurality of interconnection members. The plurality of interconnection members being linearly slidable with respect to one of the stem drive element and sleeve.

The method may further comprise providing a first channel in at least one of the stem drive element or the sleeve and inserting at least one of the plurality of interconnection members into the first channel. The method may further comprise providing a second channel in at least one of the stem drive element or the sleeve, and/or inserting at least one of the plurality of interconnection members into the second channel.

In a preferred embodiment, the method of claim may further comprise providing that each of the interconnection members has a rotatable connection on one end and a slidable connection on an opposite end thereof, and/or providing a plurality of channels on at least one of the stem drive and the sleeve for receiving the slidable connection on the plurality of interconnection members, and/or providing a plurality of holes on at least one of the stem drive and the sleeve for receiving the rotatable connection on the plurality of interconnection members.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1b is an illustration of flow across a cross sectional view of an embodiment of the invention when the embodiment is in an open position.

DESCRIPTION AND PRESENTLY PREFERRED MODES FOR CARRYING OUT THE INVENTION

Figure 1:
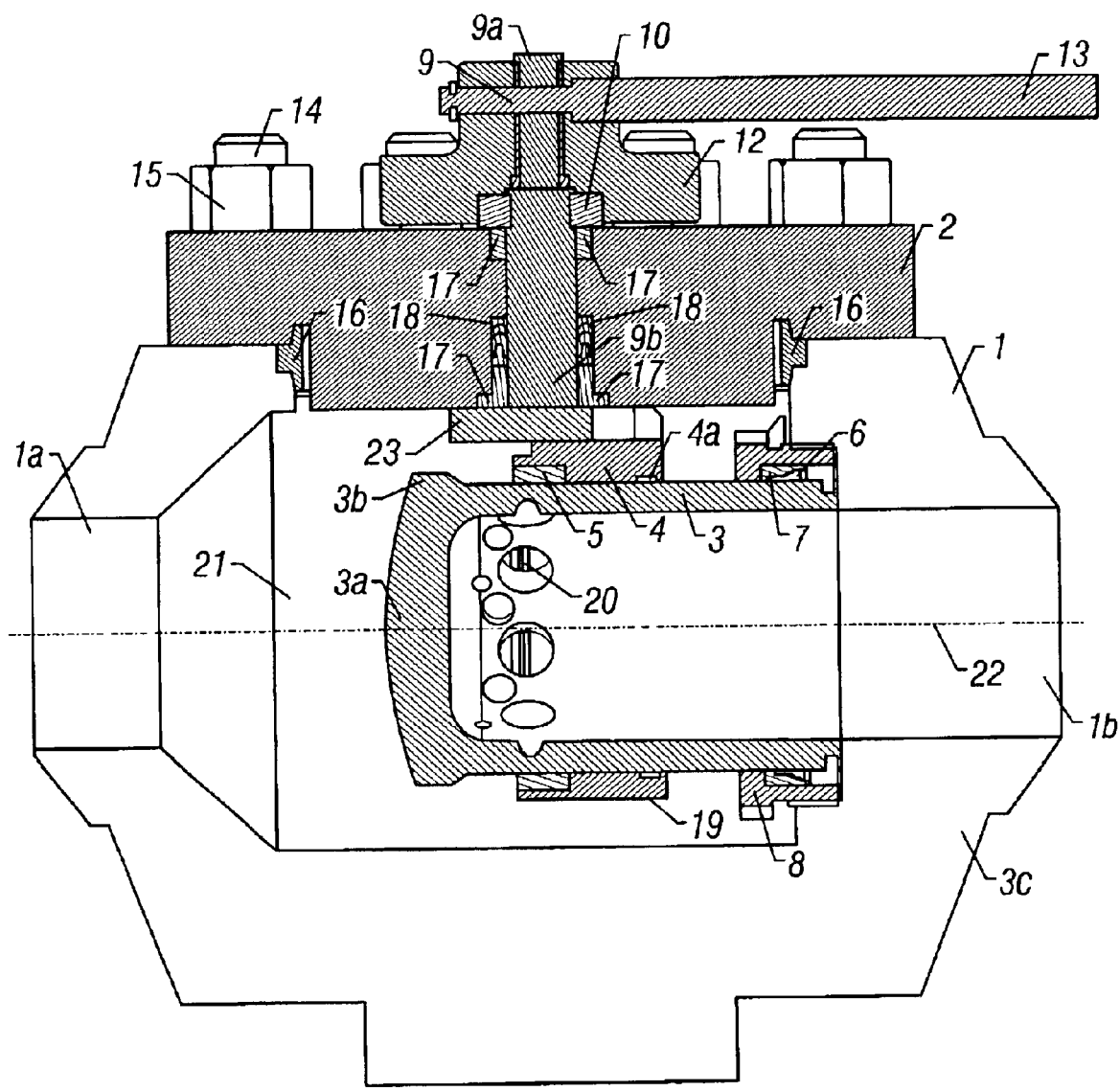
FIG. 1 is a cross sectional view of an embodiment of the present invention.
Figure 3:
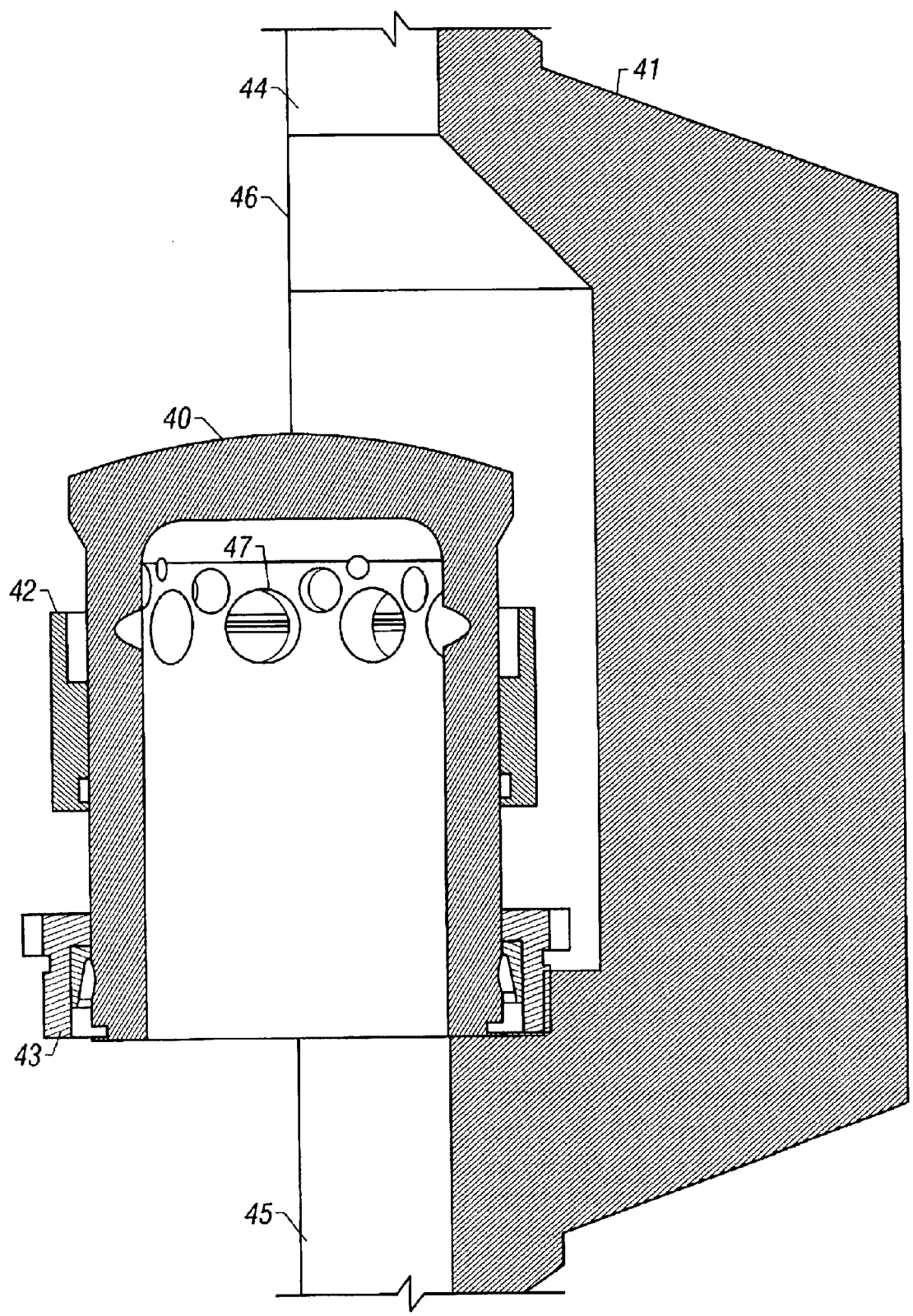
FIG. 3 is a cross sectional view of an embodiment of the present invention from a perspective at a 90-degree rotation from that in FIG. 1.
Figure 4A:
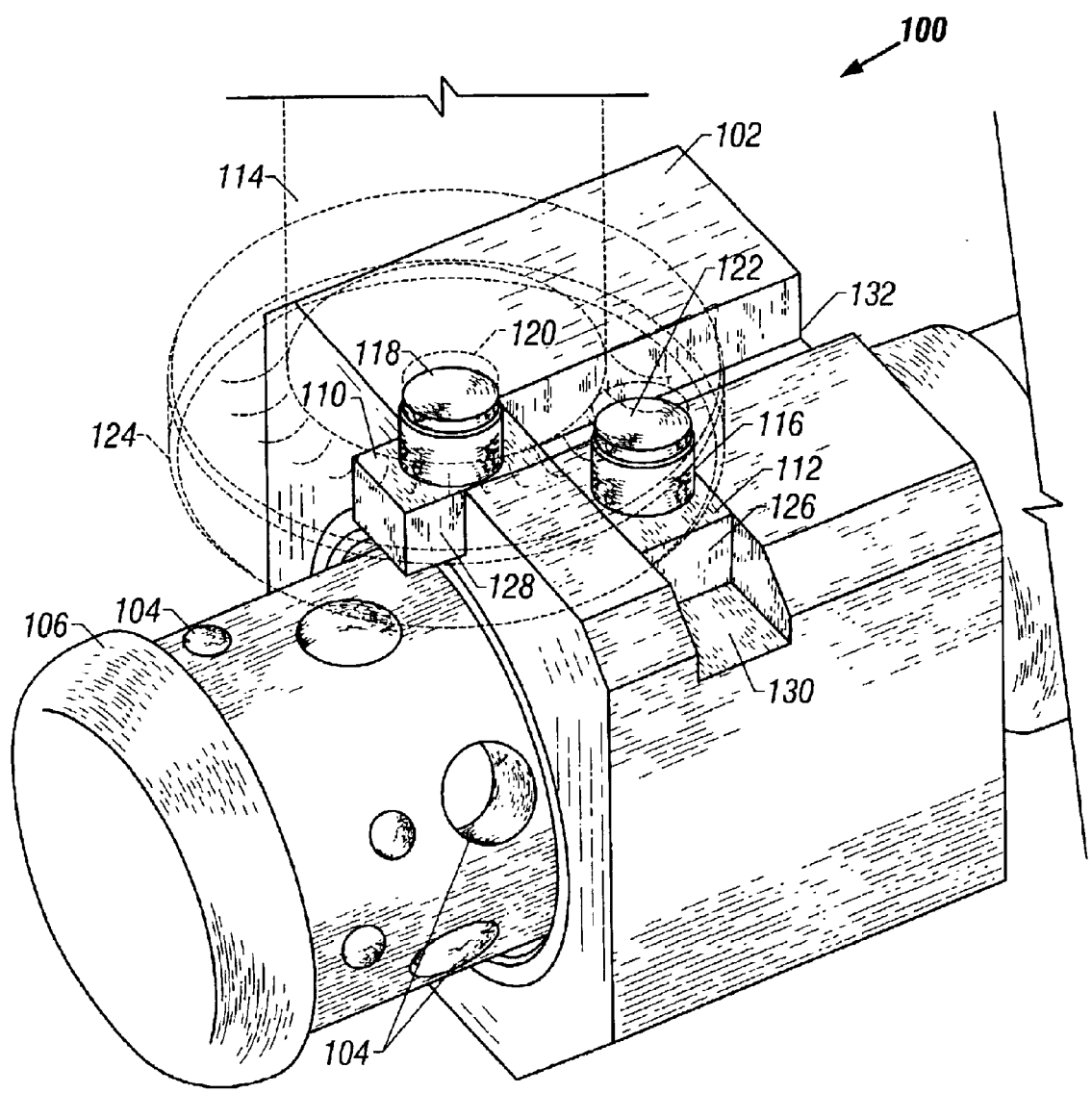
FIG. 4a is a perspective view, partially in phantom lines, of a rotary to linear drive means for a valve element in accord with the present invention and showing the valve element in the open position.
Figure 4B:
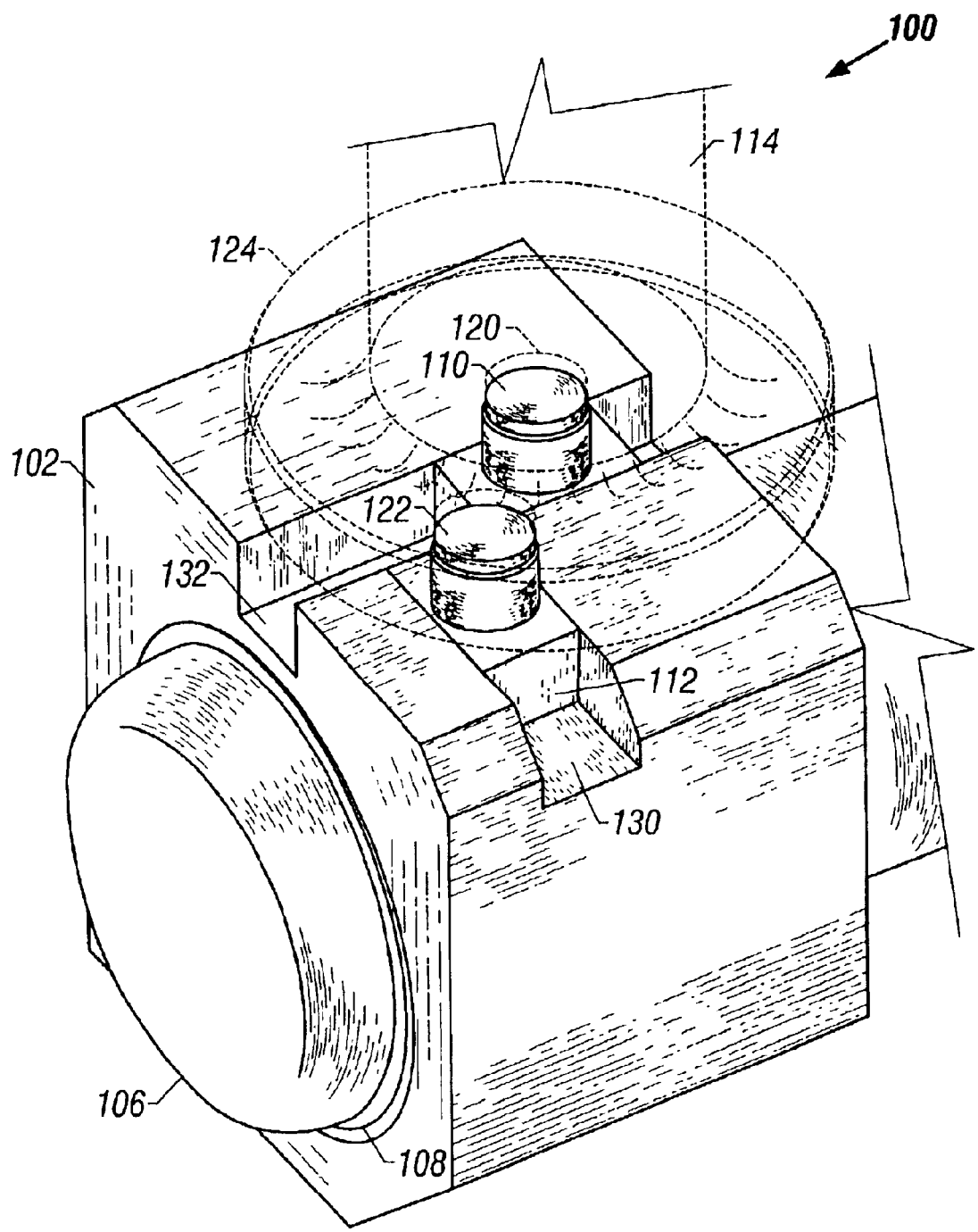
FIG. 4b is a perspective view, partially in phantom lines, of the rotary to linear drive means of FIG. 4a after operation to place the valve element in the closed position.

The presently preferred embodiment of the present invention is shown in FIG. 4a and FIG. 4b. However, the presently preferred embodiment may have many operational characteristics in accord with the embodiments discussed in FIG. 1 through FIG. 3. Therefore, referring now to the drawings and, in particular, to FIG. 1. FIG. 1, a cross sectional view of an embodiment of the present invention, is illustrative of a general construction of an embodiment of the valve. Generally, a valve of a presently preferred embodiment of this invention may be formed from the interaction of a cage 3 and sleeve 4 within a housing 1. Either cage 3 or sleeve 4 or both could be moveable with respect to housing 1, although in a preferred embodiment, cage 3 is affixed to housing 1 and sleeve 4 is linearly moveable with respect to cage 3 and housing 1.

In an embodiment, housing 1 provides a cavity 21 or an interior portion around at least a portion of the exterior surface of the cage 3. In a preferred embodiment, housing 1 is composed of a material such as tungsten carbide, steel, iron, aluminum or plastic. However, any other material common in the art may be used such as copper, lead, silver or ceramics. Housing 1 generally has at least one opening. In a preferred embodiment, housing 1 provides a cavity 21 that is sealed around an opening 1a and an opening 1b to provide an inlet and an outlet for fluid flow.

In a preferred embodiment, housing 1 is composed of separate pieces. In a presently preferred embodiment, housing 1 has a separable bonnet 2. Bonnet 2 of a preferred embodiment of the present invention is generally circular in shape with a sufficient thickness to withstand a pressure of a substance that the valve will handle such as petroleum products, water, steam, natural gas, and other gases, emulsions and liquids. Preferably, but not necessarily, bonnet 2 is composed of a material such as steel, tungsten carbide, aluminum, iron or plastic. Bonnet 2 may be secured to housing 1 by bolts or fasteners common in the art. In a preferred embodiment, bonnet 2 is bolted to housing 1 with bolts 14 and nuts 15. In an embodiment, the bolts 14 and nuts 15 are positioned around the edge of bonnet 2 and assisting in forming a seal between housing 1 and bonnet 2. In another embodiment, a bonnet seal 16 may be used between the housing 1 and the bonnet 2 to effectuate a seal that may prevent a substance from passing out of cavity 21 between the housing 1 and bonnet 2. Bonnet seal 16 may be composed of any material common in the art. In a preferred embodiment, bonnet seal 16 is a metal gasket. A preferred metal to use is stainless steal. However, various other metals such as tungsten carbide, iron or aluminum also work. Other preferred materials include rubber, plastic and like compounds and substances.

In an embodiment of the present invention, a rotatable stem shaft or rotatable stem 9 extends through the housing 1 into cavity 21. In a most preferred embodiment, actuator shaft or stem 9 extends through bonnet 2 via a sealed hole or passageway, generally the size of stem 9, and engages sleeve 4 along a lower end 9b of stem 9. In one embodiment of the invention, as described in the parent to this application, the manner of engagement of lower actuator or stem end 9b with sleeve 4 is through a rack 23, secured to sleeve 4, and pinion (not shown in this figure) gear along sleeve 4. In that embodiment, rack 23 is fixedly connected to sleeve 4. As the stem 9 is rotated, the pinion is also rotated thereby causing linear movement of the rack 23 and linear or translational movement of sleeve 4. In this embodiment, sleeve 4 is connected to rack 23 such that rotation of a pinion, as discussed subsequently, causes the movement of both rack 23 and sleeve 4. Rack 23 may be removably attached to sleeve 4 to allow different sized racks with different numbers of teeth to be inserted. Further, that embodiment of the invention provided that a pinion that may be fixedly connected to stem 9 or removably attached to stem 9 to allow different sized pinions with different numbers of teeth to be inserted.

Actuator or stem 9 may utilize bearings 10, stem packing 18, and bushing 17 positioned on or around the stem to more easily allow rotation of stem 9. Bushing 17 is positioned circumferentially around the stem 9 between stem 9 and bonnet 2 as stem 9 extends from cavity 21 into bonnet 2 and bushing 17 may be positioned circumferentially around stem 9 between stem 9 and bonnet 2 where stem 9 extends above bonnet 2. Further, stem packing 18 may be positioned between bonnet 2 and stem 9. Stem packing 18 may be positioned between bonnet 2 and stem 9, as stem 9 passes through bonnet 2. Stem 9 may utilize a circumferentially surrounding bearing 10 between stem 9 and indicator head 12 to facilitate a movement of stem 9. In this embodiment, the preferred movement of stem 9 is rotational.

Figure 1A:
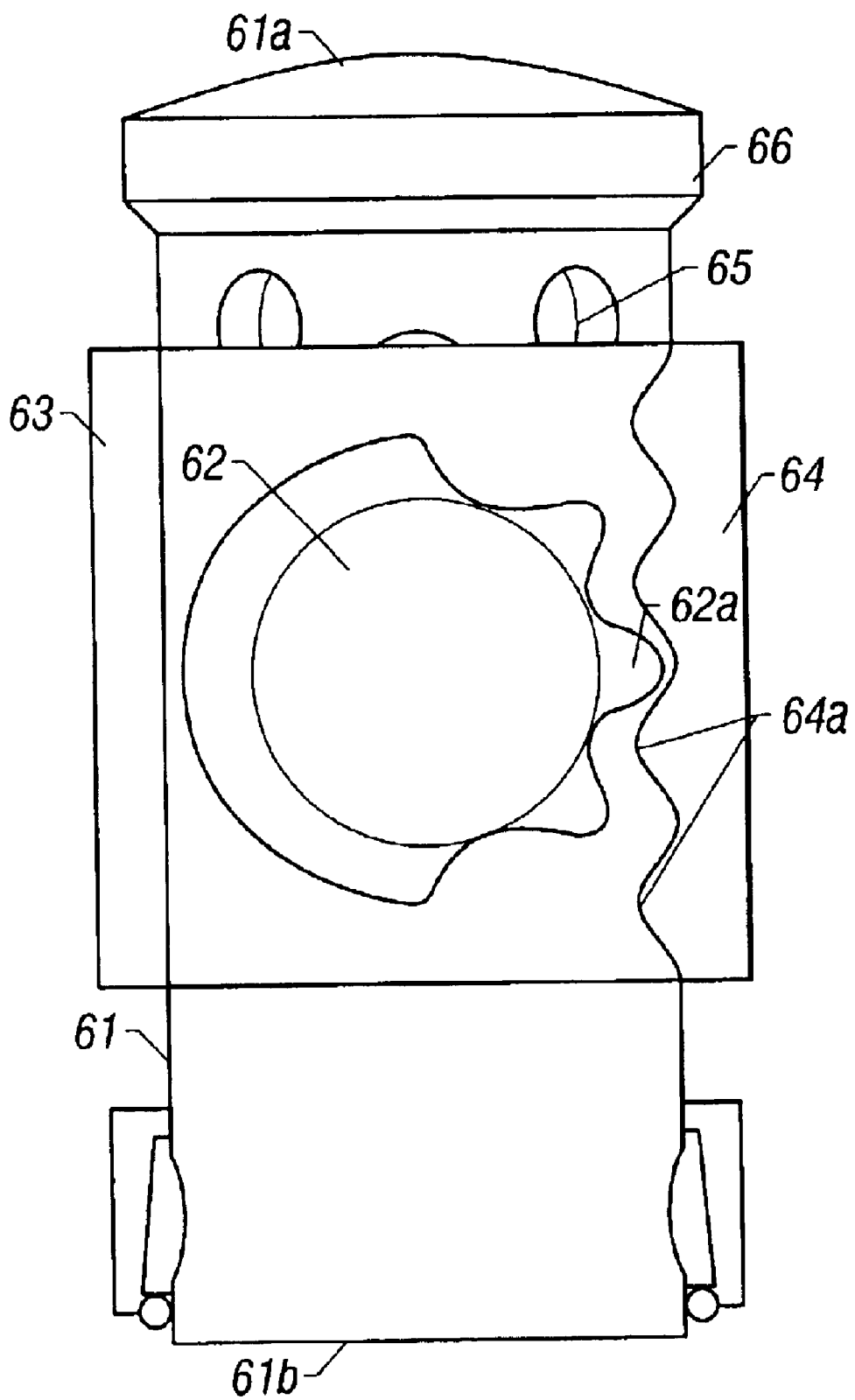
FIG. 1a is an illustration of an embodiment of a valve for FIG. 1.

Referring to FIG. 1a, an illustration of an embodiment of a valve for FIG. 1, in which a rack and pinion gear is disclosed. In this embodiment, cage 61 is circumferentially surrounded by sleeve 63. However, other embodiments of the present invention contemplate a sleeve not circumferentially surrounding the cage. In this embodiment, sleeve 63 has a rack 64 in communication with a pinion 62 such that as the pinion is rotated the rack 64 is moved in a linear manner selectively obscuring or revealing port 65 dependent upon the rotation of pinion 62 and selected movement of rack 64. Cage 61 may have a flared end 66 having closed end 61a to limit the linear motion of sleeve 63. It may be noted that as the pinion 62 is rotated the cams 62a applies force along cams 64a such that sleeve 63 is translated linearly. A rack 64 with a plurality of teeth and a pinion 62 has a plurality of offsetting teeth such that the teeth of rack 64 and pinion 62 may interact and convert the rotational motion of the pinion to linear motion of the rack. If a rack and pinion is utilized, the rack may have five teeth and a pinion may have four teeth for meshing engagement. However, the exact number of teeth on either the rack or pinion is discretionary. Further, other embodiments of the gearing system are contemplated such as a right angle gear. In that embodiment, not illustrated, the right angle gear is applied to sleeve 63 to obtain the linear translational motion. Further embodiments include gears operated with the assistance of cams. Generally, the rack 64 and pinion 62 are constructed such that a 90-degree rotation of stem 9 (not shown in this figure) will move sleeve 63 from a position where port 65 is obscured to a position where port 65 is not obscured. In one embodiment, a 90-degree rotation of a stem moves the rack and sleeve opening and closing the valve such that fluid may flow across port 65 in one position but not flow in another position. As will be understood by those of skill in the art, port 65 or ports may be any shape and remain within the principles of the present invention, for instance circular, trapezoidal, quadrangular, and triangular.

Referring back to the embodiment shown in FIG. 1, upper end 9a of stem 9 extends above the bonnet 2. Handle 13 or other types of operators such as powered operators, may be attached to the upper end 9a of stem 9. Handle 13 may be used to rotate stem 9. Circumscribing a portion of stem 9 may also be an indicatorhead 12. Indicatorhead 12 may be calibrated with markings to indicate a plurality of positions handle 13 or other operators may be rotated. In a most preferred embodiment indicatorhead 12 is marked to indicate an open and a closed position. If desired, bearing 10 may be used to facilitate rotation of handle 13. Bearing 10 may be placed in circumferential contact with stem 9. Bearing 10 facilitates the rotation of stem 9 thereby reducing the force required on handle 13 to move sleeve 4.

Referring further to FIG. 1, cage 3 may generally comprise a tubular structure. In one embodiment, cage 3 has a closed end 3a and an open end 3c. Cage 3 may be secured within cavity 21 of housing 1 such that the open end 3c of cage 3 is in communication with an opening 22 in housing 1. Cage 3 may be secured to housing 1 by any means common in the art. Preferred embodiments utilize threads, pins, sleeves, or shoulders to attach cage 3 to housing 1. Cage 3 is preferably sealed with respect to housing 1 about opening 1b. Cage 3 may be preferably removably attached to housing 1 about opening 1b, such as by threads. However, the manner of attachment may be by any means common in the art such as by bolts, adhesive or the like. A portion of housing 1 near opening 1b is preferably threaded. Retainer nut 8 may be attached to sleeve 4 along an end proximate to opening 1b by any means common in the art, for example, threads, welds, bolts, glue, and others. Additionally, retainer nut 8 may be threaded along a portion of retainer nut 8, preferably along an outer surface such that retainer nut 8 may be threadedly engaged with housing 1 near opening 1b. The engagement is such that a seal is preferably formed between cage 3 and housing 1.

Referring further to the embodiment shown in FIG. 1, sleeve 4 circumferentially surrounds cage 3 such that sleeve 4 translates linearly along the cage 3 to a plurality of positions in such a manner that sleeve 4 in a first position will obscure port or ports 20 either totally or partially and in a second position will totally obscure port 20 and sealingly prevent flow of a substance across port 20. In the preferred embodiment, the method of translation is linear movement along cage 3. Sleeve 4 may include a seal 19 extending between sleeve 4 and cage 3 in a circumferential manner or seal 4 may be located about cage 3 at areas where a substance may pass. In a preferred embodiment, a notch 4a may be cut or formed into sleeve 4 and a ring-seal 19 may be placed in notch 4a. In a most preferred embodiment, ring-seal 19 extends circumferentially in contact with sleeve 4 and cage 3 to form a seal. However, ring-seal 19 is not necessary for the present invention to function. Additionally, this embodiment has an insert 5 along sleeve 4. Insert 5 may be removably attached to sleeve 4 and positioned in circumferential contact with cage 3 and sleeve 4 at a portion of sleeve 4 proximate to port 20. Insert 5 maybe constructed of any material common in the art. In one embodiment, insert 5 is constructed of metal, such as iron, steel, tungsten carbide or aluminum. However, other embodiments incorporate plastic and rubber as insert 5.

Referring now to FIG. 1b, there is illustrated a flow across a cross sectional view of an embodiment of the invention when the valve is in an open position. It may be seen in this embodiment that the placement of port 25 is critical in the longevity of the cage 24 and housing 26 because a proper placement of port or ports 20 will reduce impingement on the valve and valve body's surfaces. In one embodiment, a plurality of ports 20, for example, four ports 25 are arranged circumferentially around a periphery of cage 24 to reduce impingement on housing 26 and cage 24. In one embodiment, at least one group of four ports 25 is arranged around a circumferential line equidistant from each other such that the flow across the ports 25 is directed substantially across the lateral external surface of cage 24 and into ports 25, thereby reducing the impingement of the flow upon the rounded-off end 3a of cage 24 and housing 26. In one embodiment, there is more than one group of four ports 25 in adjacent circumferential alignment allowing 360 degree fill of housing 26 about cage 24. Placement of ports 25 can be done selectively, but is preferably directly related to the contemplated amount of impingement on cage 24 and housing 26.

An embodiment of the present invention further reduces impingement of the cage 24 and housing 26 by placement of sleeve 27, in FIG. 1b. In a preferred embodiment, a substance, most commonly a fluid, may enter an embodiment of the valve assembly at opening 29 and generally flow as shown by the flow path 28 through housing 26, across port 25, into cage 24 and out opening 30. A most preferred embodiment reduces impingement of the valve by both placement of four ports 25, as described above, and placement of sleeve 27. Sleeve 27 may be positioned along an exterior surface and/or an interior surface (not shown) of cage 24 such that flow path 28 of the substance may enter port 25 before flowing across sleeve 27. Placement of sleeve 27 such that the flow path 28 of the fluid may enter port 25 before flowing across sleeve 27 reduces the impingement on sleeve 27, thereby reducing the wear and tear of a fluid flowing across sleeve 27. This reduction of impingement on a sleeve 27 will allow for increased valve life because the necessary components of embodiments of the present invention will not be prematurely destroyed from impingement. The placement of the ports as herein described best allows for an equal, uninterrupted, non-turbulent flow of the substance across the ports and reduces impingement on the valve.

Referring again to FIG. 1, there is illustrated a cross sectional view of one embodiment of the invention. Generally, in the closed position, sleeve 4 forms a seal with cage 3 that will not allow a substance to pass across port 20 and into cage 3. In another embodiment, the seal may be a metal to metal seal. However, in another embodiment, an insert 5 may be used to form a seal. Generally, cage 3 may be shaped in a tubular fashion. An embodiment of cage 3 is in a generally tubular shape. In one embodiment, the generally tubular shape of cage 3 has a flared end 3b located near the closed end 3a of cage 3. The flared end 3b may be a small sharp rise in the circumferential surface of cage 3 such that sleeve 4 is restricted from translational motion towards closed end 3a after abutting the flared end 3b on cage 3 Further, a flared end 3b may help to seal cage 3 and sleeve 4 when sleeve 4 is abutting flared end 3b and aid in preventing a substance from crossing port 20 from cavity 21 of housing 1. In one embodiment, flared end 3b may operate as a mechanical stop for the linear motion of sleeve 4.

Preferably, an embodiment of the invention is connected at opening 1a and opening 1b to a fluid supply and delivery system such that the new and improved valve maybe used as a control valve. In one embodiment, the fluid in the open position flows from opening 1a into cavity 21. A selected amount of fluid may be allowed to flow into and out the cavity within the interior of the cage 24 merely by rotating the handle 13. Movement of handle 13 may cause rotation of stem 9 and a pinion (not shown in FIG. 1) along a rack (not shown in FIG. 1) connected to a sleeve 4 thereby moving the sleeve 4 to selectively obscure port 20.

Figure 2:
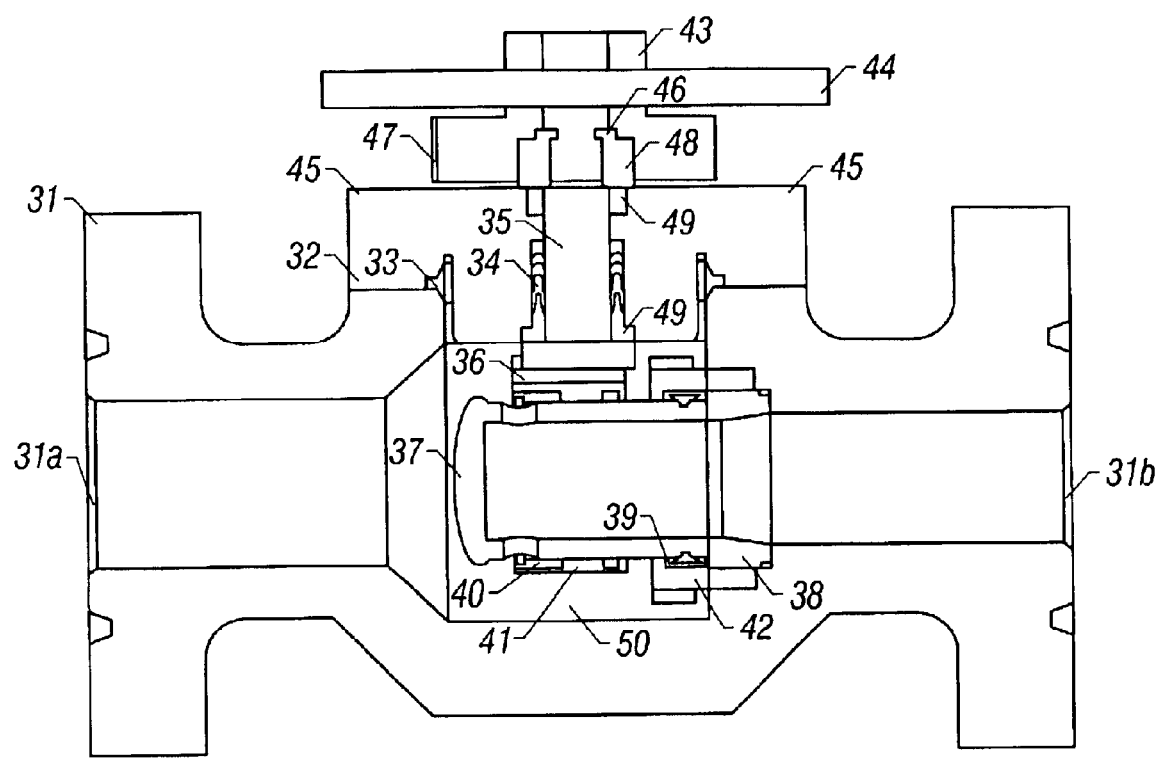
FIG. 2 is a cross sectional view of an alternate embodiment of a valve in an in-line arrangement.

Referring now to FIG. 2, there is illustrated an alternate embodiment of a valve in an in-line arrangement, and it is noted that embodiments of the present invention contemplate different configurations. It may also be noted that handle 44 of this embodiment is a bar extending from a stem 35. Other embodiments of a handle envision circular plates or circular frames. As well, the stem or gear may be operated by any mechanical, electrical, hydraulic or pneumatic means common in the art. One preferred embodiment of the invention utilizes an electric motor to rotate the stem 35 or gear to a plurality of positions.

The embodiment illustrated in FIG. 2 is especially suited for industrial applications where an operator may desire to control the flow of a substance across a valve. A substance most commonly will enter opening 31a and flow into cavity 50. An operator may selectively allow a certain amount of the substance to pass through port or ports 51 by turning stem 35. In one embodiment, stem 35 is in communication with cage 37 via a sleeve carrier 36 and passes through a bonnet 32 attached to body 31 with bonnet bolting 45. The sleeve carrier 36 may or may not be fitted with a pinion with teeth. However, the specific number of teeth is unimportant and varying numbers are within embodiments of this invention. If utilized, the pinion located on sleeve carrier 36 is in further communication with a rack or cam (not shown) along cage 37 whereas the rotating of stem 35 rotates the pinion and translates the sleeve in a generally linear fashion. The rotating of stem 35 is facilitated by the handle 44 attached to stem 35 by indicatorhead or bolt 43. To further facilitate the rotation of stem 35 a stem packing 34 may be utilized and a thrust bearing 49. As the sleeve cage 37 is translated along sleeve 40, port or ports 51 are exposed and the substance may flow through port or ports 51 into an interior portion of sleeve 40 and out opening 31b.

To improve a seal between stem 35, bonnet 32, sleeve 37 and body 31 various seals may be utilized. A bonnet seal 32 may be positioned along an edge of the connection of bonnet 32 and body 31. The seal along stem 35 and bonnet 32 may be effected by the thrust bearing 49 and/or sleeve carrier 36. The seal between cage 37, sleeve 40 and sleeve carrier 36 may be improved by a sleeve seal 41. Sleeve seal 41 is most commonly a gasket positioned circumferentially around cage 37 between sleeve carrier 36 and cage 37.

To facilitate the connection of cage 37 to body 31 a cage retainer 42 may be used. The cage 37 is typically threadedly connected to the cage retainer 42, but may be bolted or attached in another manner. To assist in the maintenance of a seal between cage retainer 42 and body 31 a split ring 39 and spacer 38.

Various other embodiments of this valve include in FIG. 2 include such features as indicator plates 47, to indicate the position of the valve or handle. Spacer 48 spaces the handle 44. Retaining ring 46 assists attachment of the handle 44 and spacer 48.

Referring now to FIG. 3, there is shown a cross-sectional view of one embodiment of the invention from a view rotated ninety degrees from FIG. 1. Cavity 46 is more easily shown and depicted. It may be observed that as a substance, most commonly a fluid, enters at opening 44 and will substantially fill cavity 46 and enter port 47 and flow towards outlet 45. It may be observed that as sleeve 42 is moved further away from a closed end of cage 40, port 47 will be larger and allow more fluid to pass into the interior of cage 40.

The present invention further encompasses a method of translating a rotational force into a linear force to cause a sleeve to selectively open and close a port along a valve. The method comprises obtaining a valve with a housing having an interior cavity, an exterior portion and an entry point, and a cage, the cage having an open end and a closed end. The open end is in communication with the exterior portion of the housing. At least one port is provided that is positioned about a periphery of an exterior surface such that the port allows communication from the housing to the interior portion of the cage whereby impingement of the interior surface of the cage is minimized. A sleeve disposed about the cage. The method may further involve translating a rotational force into a linear force to cause the sleeve to move along the cage. The sleeve is selectively moveable by the rotational force from a position exposing at least a portion of the port to a position not exposing the at least a portion of the port The invention and method associated with this invention fully contemplates all gears capable of a translating rotational force into a linear force such as a rack and pinion whereby as the pinion is rotated the rack is translated to a plurality of positions. Further, the invention and method associated with this patent contemplate the fluid or substance flowed across the valve to be any liquid or gaseous substance with a viscosity low enough to move across the ports such as a petroleum product, resin, liquid and colloidal fluid.

Figure 5:
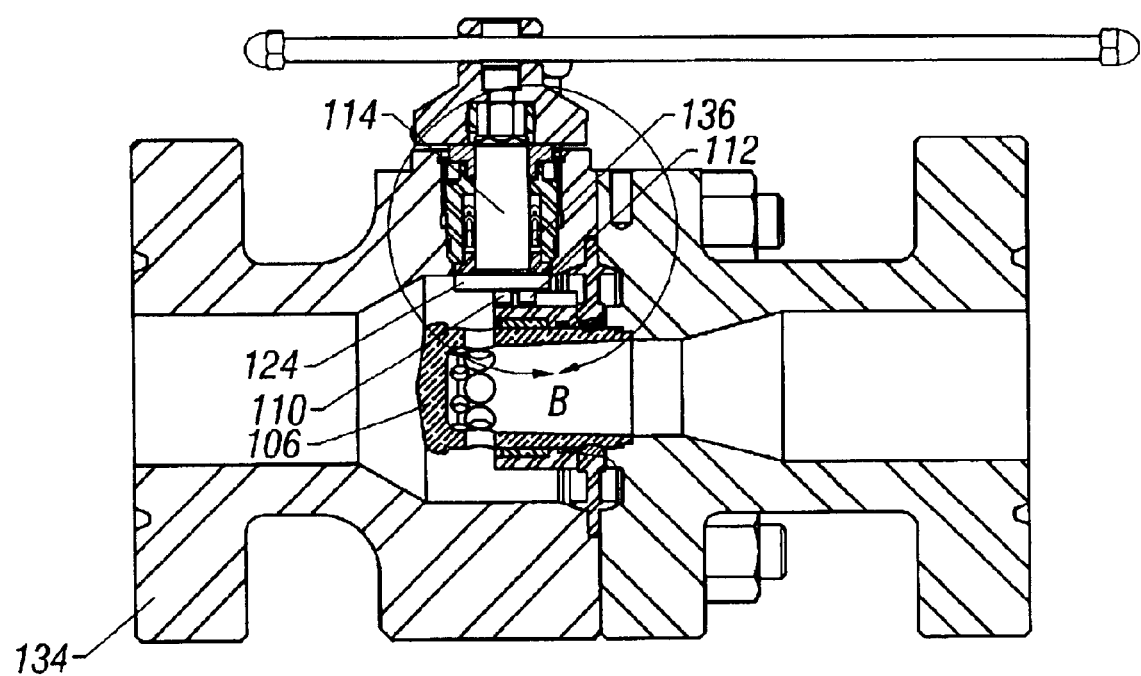
FIG. 5 is an elevational view, partially in section, of an axial flow valve that incorporates the rotary to linear drive means of FIG. 4a and FIG. 4b for operation thereof in accord with the present invention.

FIGS. 4a and 4b disclose yet another embodiment of the present invention that includes rotary-to-linear mechanism 100. FIG. 5 shows a side view of the configuration of FIGS. 4a and 4b that is basically similar to previous embodiments except for the interconnection members 110 and 112, as discussed subsequently. Rotary-to-linear mechanism 100 utilizes sleeve 102 to move linearly or translationally to thereby cover and uncover holes 104 in cage 106. In FIG. 4a, sleeve 102 is positioned to permit fluid flow through holes 104 in cage 106. In FIG. 4b, sleeve 102 is positioned to cover and thereby seal off holes 104 in cage 106. Various type of seal materials and/or sealing sleeves or surfaces 108 may be utilized to seal off holes 104.

Interconnection links or members 110 and 112 are utilized to interconnect sleeve 102 with rotary actuator shaft or stem 114. Interconnection members 110 and 112 each have a rotatable connection, such as pin sides 116 and 118. In this embodiment, rotatable portions utilize pin sides 116 and 118 for rotation in round sockets 120 and 122 formed in stem or actuator drive disk 124. Drive disk 124 could take different shapes but needs to interconnect with interconnection members 110 and 112. Pin sides 116 and 118 are free to rotate in round sockets 120 and 122 to thereby form rotatable connection. Other types of rotation connections, such as swivel joints, pivotal connections and so forth may be utilized as well. Interconnection members 110 and 112 each have a linear movement portion such as slidable portions 126 and 128. Other types of linear movement elements such as round pegs, guides, fins, and so forth could be utilized. In this embodiment, slidable portions 126 and 128 are mounted for sliding movement within channels 130 and 132. Channels 130 and 132, in this embodiment are formed at right angles with respect to each other so that channel 132 is in line with the linear line of movement of sleeve 102 and channel 130 is perpendicular to the linear line of movement of sleeve 102. However, channels 130 and 132 could be oriented differently to achieve the same effect because sleeve 102 is constrained to move only along cage 106 regardless of exactly how the forces are applied by interconnection members 110 and 112.

The size and depth of channels 130 and 132 and of sockets 120 and 122 provides walls of sufficient size for mating with corresponding sides of interconnection member 110 and 112 for best transferring the amount of energy needed to move sleeve 102 with respect to cage 106 for controlling fluid flow therethrough.

In operation, starting in FIG. 4a, as stem 114 is rotated clockwise, the interconnection member 112 holds that part of drive disk 124 in position along the linear length of channel 130. Interconnection member 110 holds drive disk 124 along the linear length of channel 132. The two interconnection members therefore constrain drive disk 124 and sleeve 102 to move relative to each other. Stem 114 is constrained to stay in position along the axis of rotation thereof as indicated in FIG. 5. In this embodiment cage, 104 is affixed to valve body 134. Sleeve 102 is constrained to linear or translational movement with respect to cage 106. Thus, in response to rotation of stem 114, then sleeve 102 must move linearly or translationally. Sleeve 102 can only move in a linear direction to cover holes 104 as shown in the closed position of FIG. 4b. To move in the opposite direction, stem 114 is rotated counterclockwise. In this manner, fluid flow can be controlled. Interconnection members 110 and 112, drive 124, and channels in sleeve 102 are relatively inexpensive to manufacture. The same design can be utilized in different valve sizes. Many different types of actuators, either automatic or manual, may be used for operation thereof. In this design, the rotary-to-linear assembly is sealed within valve body 134 by stem seal 136 and/or other seals so as to be exposed to fluid pressure. The construction is robust so that such exposure will not cause significant wear of the relatively simple components.

Many modifications may be made to the invention as will become apparent to those of ordinary skill in the art. For example, the embodiments described above were for in-line valves while the present invention operates in conjunction with all angles of connection and is specifically contemplated for such operations. The cage could be moveable instead of the sleeve. Different types or numbers of interconnection members could be utilized. For instance, additional interconnection members could be utilized in associated channels to distribute the forces and/or also reduce the force applied to the individual interconnection members. The channels could be provided on the stem drive and sockets provided on the sleeve, if desired. The interconnection members could simply be round pegs along their entire length.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A valve for controlling a fluid flow through said valve, said fluid having a fluid pressure, said valve comprising:
   a valve housing, said valve housing being substantially tubular and comprising a tubular wall, said tubular wall defining a fluid flow path within said tubular wall, said valve housing defining an inlet for receiving said fluid into said fluid flow path, said valve housing defining an outlet through which said fluid exits from said fluid flow path of said valve housing, said valve housing defining an stem aperture within said tubular wall;

a rotatable stem extending through said stem aperture, said rotatable stem having a stem axis of rotation;

a stem drive element for said rotatable stem drive shaft;

a closure element slidably mounted for linear movement with respect to valve housing to thereby control said fluid flow through said valve; and a plurality of interconnection members for interconnecting said rotatable shaft and said closure element, said plurality of interconnection members being slidably mounted to at least one of said stem drive element or said closure element.

2. The valve of claim 1, further comprising a tubular cage, said tubular cage defining apertures therein which are coverable and uncoverable by said closure element.

3. The valve of claim 1, further comprising:

at least one of said stem drive element or said closure element defining a first channel and a second channel, said plurality of interconnection members each having a linear connection, said linear connection for said plurality of interconnection members being mounted within said first channel and said second channel.

4. The valve of claim 3, wherein each said linear connection is mounted for linearly sliding movement.

5. The valve of claim 4, wherein said first channel and said second channel are oriented in offset directions with respect to each other.

6. The valve of claim 3, wherein said plurality of interconnection members have a rotatable connection at one end thereof and a linearly slidable connection at an opposite end thereof.

7. A method for assembling a valve, comprising:

providing a valve body with an inlet and an outlet;

providing a sleeve and a cage such that said sleeve is slidable in a linear direction to cover and uncover apertures on said cage;

inserting said cage and said sleeve into said valve body;

securing a rotatable stem into said valve body;

providing a stem drive element on and end of said rotatable stem; and interconnecting said stem drive element and said sleeve with a plurality of interconnection members, said plurality of interconnection members being linearly moveable with respect to one of said stem drive element and sleeve, said plurality of interconnection members being rotatably moveable with respect to one of said stem drive element and sleeve.

8. The method of claim 7, further comprising providing a first channel in at east one of said stem drive element or said sleeve; and inserting at least one of said plurality of interconnection members into said first channel.

9. The method of claim 8, further comprising providing a second channel in at least one of said stem drive element or said sleeve; and inserting at least one of said plurality of interconnection members into said second channel.

10. The method of claim 7, further comprising providing that each of said interconnection members have a rotatable connection on one end and a slidable connection on an opposite end thereof.

11. The method of claim 10, further comprising providing a plurality of channels on at least one of said stem drive and said sleeve for receiving said slidable connection on said plurality of interconnection members, and providing a plurality of holes on at least one of said stem drive and said sleeve for receiving said rotatable connection on said plurality of interconnection members.

* * * * *